Dec. 22, 1953   C. A. JOHNSON   2,663,131
UNDERGROWTH DESTROYER
Filed Aug. 18, 1950   2 Sheets-Sheet 2
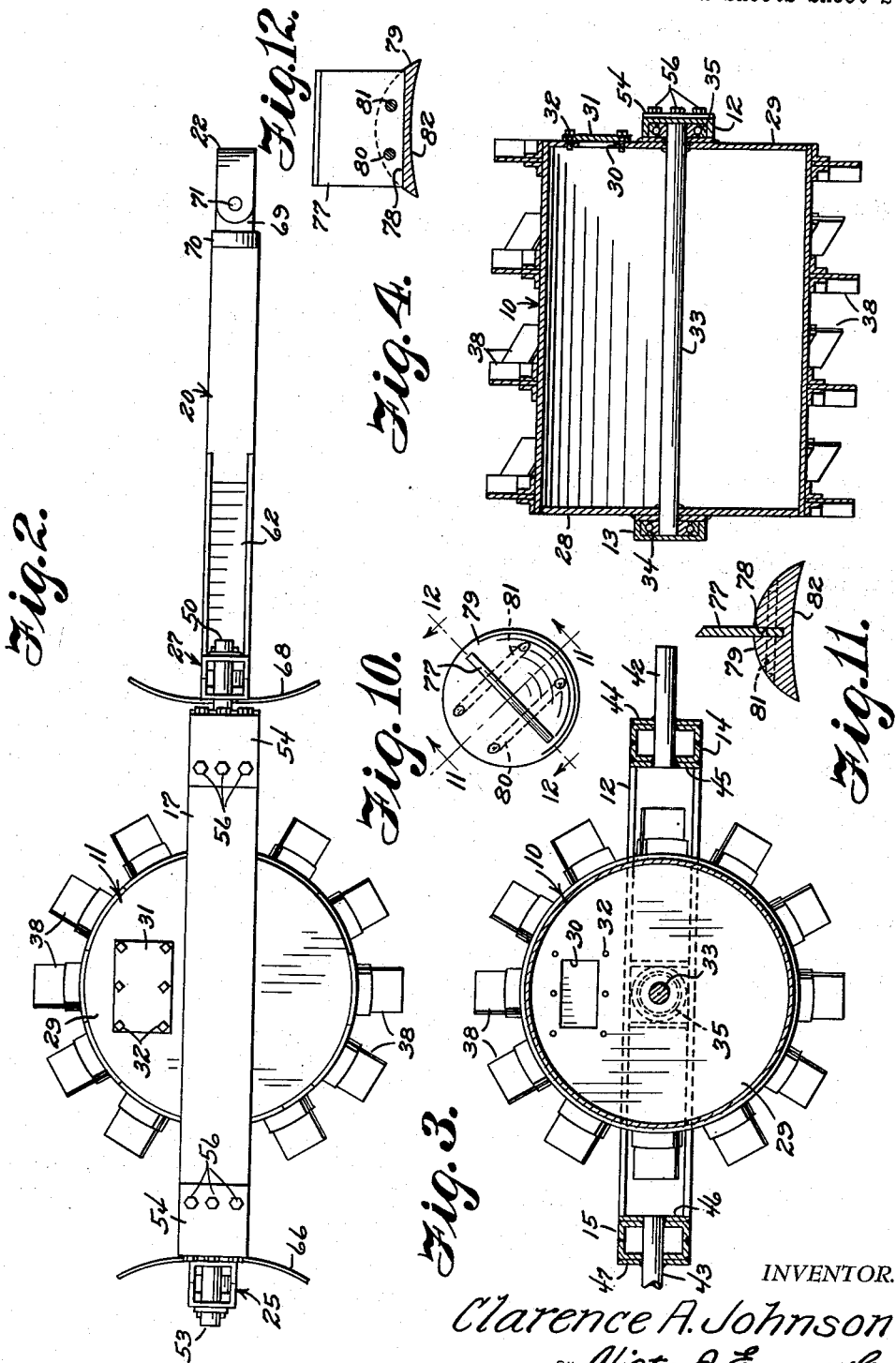
INVENTOR.
Clarence A. Johnson
BY Victor J. Evans & Co.
ATTORNEYS

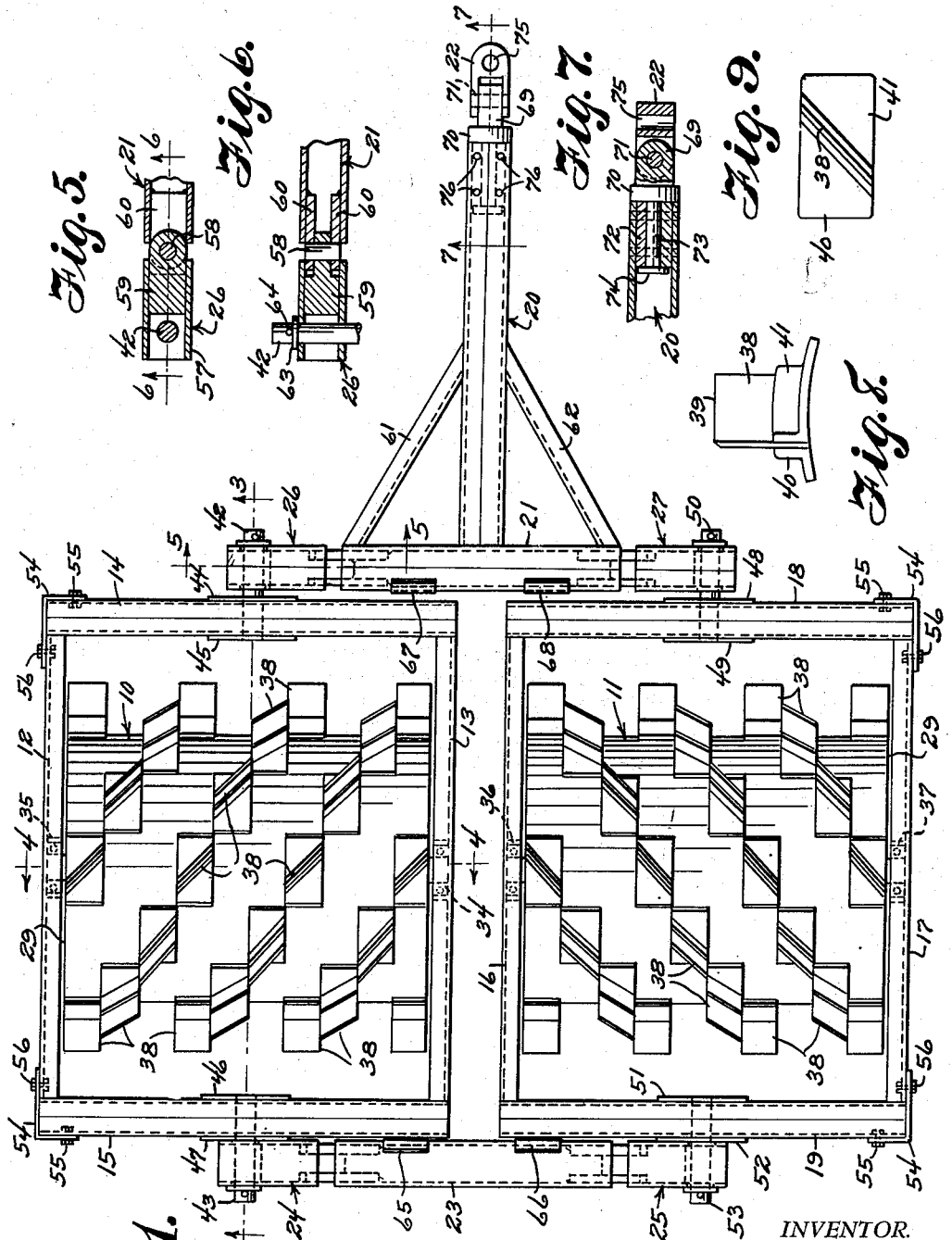

Patented Dec. 22, 1953

2,663,131

UNITED STATES PATENT OFFICE 2,663,131

UNDERGROWTH DESTROYER

Clarence A. Johnson, Guthrie, Minn.

Application August 18, 1950, Serial No. 180,271

1 Claim. (Cl. 55—47)

1

This invention relates to ground working implements of the type having diggers or cutting blades on the surface of a drum or cylinder, and in particular a pair of sand filled cylinders having blades in staggered relation mounted on and extended from the surfaces thereof with the cylinders journaled in pivotally mounted frames and with the frames journaled in hinged elements on the ends of cross bars having a tongue with a clevis mounted in a swivel joint on the forward end.

The purpose of this invention is to provide a device for chopping the growth and destroying the roots of underbrush, vines, grass and the like as the device is drawn over the soil.

Various types of rollers, plows, harrows and other implements have been provided for working the surface of soil, but under certain conditions, such as clearing under cross county high tension lines, which extend for comparatively long distances, it is desired to provide a device which when drawn across the ground cuts the growth and at the same time destroys the roots of substantially all types of undergrowth. With this thought in mind this invention contemplates a ground working implement having a plurality of drums or cylinders with diagonally positioned radially disposed blades in staggered relation on the surfaces thereof whereby as the cylinders travel over the ground the blades cut the growth above the ground and at the same time dig into the soil destroying roots therein.

The ground upon which devices of this type are used is not graded and the terrain includes numerous small hills and valleys. For this purpose the cylinders are mounted to swivel in substantially all directions whereby the implement may assume different angles and the cylinders are mounted to swing independently so that each may assume a different angle.

The object of this invention is, therefore, to provide a ground working implement whereby drums with chopping and digging blades on the surfaces are supported to swivel in substantially all directions in relation to a supporting frame.

Another object of the invention is to provide an undergrowth destroying implement in which cutting and digging blades or knives or the surfaces of drums thereof substantially pulverize the soil on which the device is used.

Another object of the invention is to provide a ground working implement having a plurality of drums with digging elements thereon in which the drums are drawn by a tongue and in which the tongue is provided with a swivel mounted clevis and is connected to drum carrying frames through hinged connections.

A further object of the invention is to provide an undergrowth destroying implement having a plurality of drums with cutting and digging elements on the surfaces swivelly mounted in a frame which is of a comparatively simple and economical construction.

With these and other objects and advantages in view the invention embodies a ground working implement having a T-shaped tongue with a

2 clevis mounted through a swivel connection on the forward end of the tongue and with bearings hinged to the ends of arms thereof with drums having staggered cutting blades on the surfaces transversely journaled in supporting frames and with the frames longitudinally journaled in the bearings at the ends of the cross bar of the tongue and also in bearings hinged to the ends of a cross bar at the rear of the frames.

Other features and advantages of the invention will appear from the following description taken in connection with the drawings wherein:

Figure 1 is a plan view of the implement showing the parts assembled.

Figure 2 is a side elevational view of the implement also showing the parts assembled.

Figure 3 is a longitudinal section through one of the drum carrying frames taken on line 3—3 of Figure 1.

Figure 4 is a longitudinal section through one of the cylinders taken on line 4—4 of Figure 1.

Figure 5 is a detail taken on line 5—5 of Figure 1 showing the hinged connection at the ends of the cross bar of the tongue and also of the cross bar at the rear of the machine.

Figure 6 is a sectional plan taken on line 6—6 of Figure 5 also showing the hinge.

Figure 7 is a longitudinal section taken on line 7—7 of Figure 1 showing the swivel connection of the clevis on the forward end of the tongue.

Figure 8 is a detail illustrating one of the cutting blades of the cylinders.

Figure 9 is a plan view of one of the cutting blades.

Figure 10 is a modification illustrating another method of mounting the blades on the drums or cylinders.

Figure 11 is a cross section taken on line 11—11 of Figure 10 illustrating the modified blade mounting.

Figure 12 is also a cross section taken on line 12—12 of Figure 10 also showing the modified form for mounting the blades.

Referring now to the drawings wherein like reference characters denote corresponding parts the improved undergrowth destroying implement of this invention includes a pair of drums or cylinders 10 and 11, the cylinder 10 being journaled in a horizontally disposed frame having side bars 12 and 13 with ends 14 and 15, the cylinder 11 being journaled in a similar frame having side bars 16 and 17 with the ends connected by beams 18 and 19, a tongue 20 having a cross bar 21 at one end and a clevis 22 at the other and a rear cross bar or arm 23 in the ends of which the horizontally disposed frames are journaled through hinged elements 24 and 25 similar to corresponding elements 26 and 27 on the ends of the cross bar 21 of the tongue.

The cylinders 10 and 11 are substantially hollow, each being provided with ends 28 and 29 and the end 29 of each cylinder is provided with a filling opening 30 having a cover plate 31 positioned thereover and secured to the ends by bolts 32.

Each cylinder is provided with a shaft 33, the ends of which are journaled in bearings 34 and 35, as shown in Figure 4 and the bearings are mounted in the side bars of the horizontally disposed frame. The cylinder 10 is illustrated in Figure 4 and the shaft of the cylinder 11 is journaled in similar bearings as indicated by the numerals 36 and 37.

In the design illustrated in Figures 1 to 9 inclusive the drums are provided with cutting blades 38 having beveled outer cutting edges 39 and the blades are mounted between angles 40 and 41 on the surfaces of the drums. As illustrated in Figure 1 the blades are positioned in staggered relation and the cutting blades on each drum slope outwardly from the center, as shown.

As illustrated in Figure 3 the horizontally disposed frames in which the drums are journaled are provided with stub shafts 42 and 43 which are mounted in the end beams of the frames. As illustrated in Figures 1 and 3 the beam 14 is provided with reinforcing plates 44 and 45 that hold the shaft 42 and the beam 15 is provided with similar plates 46 and 47 that hold the shaft 43. The frame of the drum 11 is provided with similar reinforcing plates 48 and 49 in which a stub shaft 50 is mounted, and 51 and 52 in which the stub shaft 53 is mounted.

The bars 12 and 17 forming the outer sides of the horizontally disposed frames are mounted by brackets 54 which are secured to the frames by bolts 55 and to the side bars by bolts 56.

The stub shafts 42 and 50 on the forward ends of the horizontally disposed frames in which the cutting cylinders or drums are mounted are journaled in the hinged elements 26 and 27, as illustrated in Figures 5 and 6 and as the four hinged elements 24, 25, 26 and 27 are similar the same reference numerals are used for the inner parts of each.

As illustrated in Figure 5 the stub shaft 42 is pivotally mounted in a bearing 57 and the bearing 57 is pivotally mounted by a pin 58 through sockets 59 and 60 in the end of the cross bar 21 and the ends of the cross bar 21 are secured to the tongue 20 by diagonal braces 61 and 62. The stub shafts, such as the shaft 42 are provided with washers 63 and the washers are held by pins 64.

The elements 24 and 25 are hinged to the ends of the rear cross bar 23 in a similar manner and the cross bar 23 is provided with vertically positioned arcuate guide shoes 65 and 66 to prevent the corners of the horizontally disposed frames striking the upper or lower surfaces of the cross bar. Similar vertically disposed arcuate shoes 67 and 68 are provided on the cross bar 21 of the tongue 20 for the same purpose.

As illustrated in Figures 1 and 7 the clevis 22 is pivotally mounted in a tongue 69 of a socket 70 by a pin 71 and the socket is journaled in a bearing 72 in the forward end of the tongue 20 by a pin 73. The end of the pin 73 is provided with a head 74 which is positioned against the end of the bearing 72 and the outer end of the clevis 22 is provided with an opening 75 for a king pin, shackle, or other attaching means. The bearing 72 is rigidly mounted in the forward end of the tongue 20 by pins 76.

In the modification illustrated in Figures 10, 11 and 12 cutters or blades 77 similar to the blades 38 are mounted in slots 78 in substantially semi-spherical elements 79 similar to the angles 40 and 41, by pins 80 and 81, the elements 79 are provided with arcuate under surfaces 82 that are shaped to correspond with the peripheral surfaces of the drums or cylinders. The element 79 may be secured to the surfaces of the cylinders by welding, or other suitable means.

With the parts arranged in this manner the cylinders are filled or partly filled with sand or the like and a tractor attached to the forward end of the tongue draws the implement over the ground with the surfaces of the cylinders tilting to correspond with the surface of the ground whereby substantially all parts of the soil are contacted by the blades or digging elements.

As the implement travels over the ground the cutting blades first cut vines, bushes, and substantially all under brush or undergrowth and with continued movement of the cutters or blades the sharp edges pass into the soil, the weight of the cylinders forcing the cutting elements through roots and the like whereby the soil is churned or pulverized and substantially all vegatation therein destroyed.

The hinge means, as shown in Figure 5, is such that the parts 21 and 26 will abut during pivotal movement of these parts, so as to limit sagging of the draft bar or tongue 20. Essentially the present invention includes the pair of cylinders 10 and 11 which are journaled in pivotally mounted frames so that the frames have flexibility. When a suitable towing vehicle is attached to the front end of the device, the tendency will be to pull ahead so that the frames will tend to move upwardly or straight ahead rather than downwardly, and the hinge construction shown in Figure 5 insures that the drums or cylinders will have great flexibility. Further, the hinge construction permits either end of the cylinders to move up and down independently of the other.

It will be understood that other modifications may be made in the design and arrangement of the parts without departing from the spirit of the invention.

What is claimed is:

In a ground working implement, a pair of rectangular frames, each of said frames including a pair of spaced parallel side bars, a pair of spaced parallel end pieces extending between said side bars and secured thereto, a shaft extending between each pair of side bars and journaled therein, a hollow cylinder mounted on each of said shafts and having a quantity of weighted material therein, a crossbar arranged forwardly of said pair of frames, a tongue extending forwardly from said crossbar and adapted to be attached to a towing vehicle, a crossbar arranged rearwardly of said frames, there being a filling opening in each of said cylinders, a plurality of angles secured to said cylinders, cutting blades secured to said angles and provided with beveled cutting edges, a stub shaft extending forwardly from each of said frames, a stub shaft extending rearwardly from each of said frames, a bearing pivotally connected to each of said stub shafts, said bearings being pivotally connected to said crossbars, a pair of vertically disposed arcuate shoes secured to the inner surface of each of said crossbars, and coacting means on said bearings and crossbars for limiting sagging of said tongue.

CLARENCE A. JOHNSON.

References Cited in the file of this patent

UNITED STATES PATENTS

| Number | Name | Date |
|---|---|---|
| 2,159,347 | Austin | May 23, 1939 |
| 2,410,465 | Small | Nov. 5, 1946 |